UNITED STATES PATENT OFFICE.

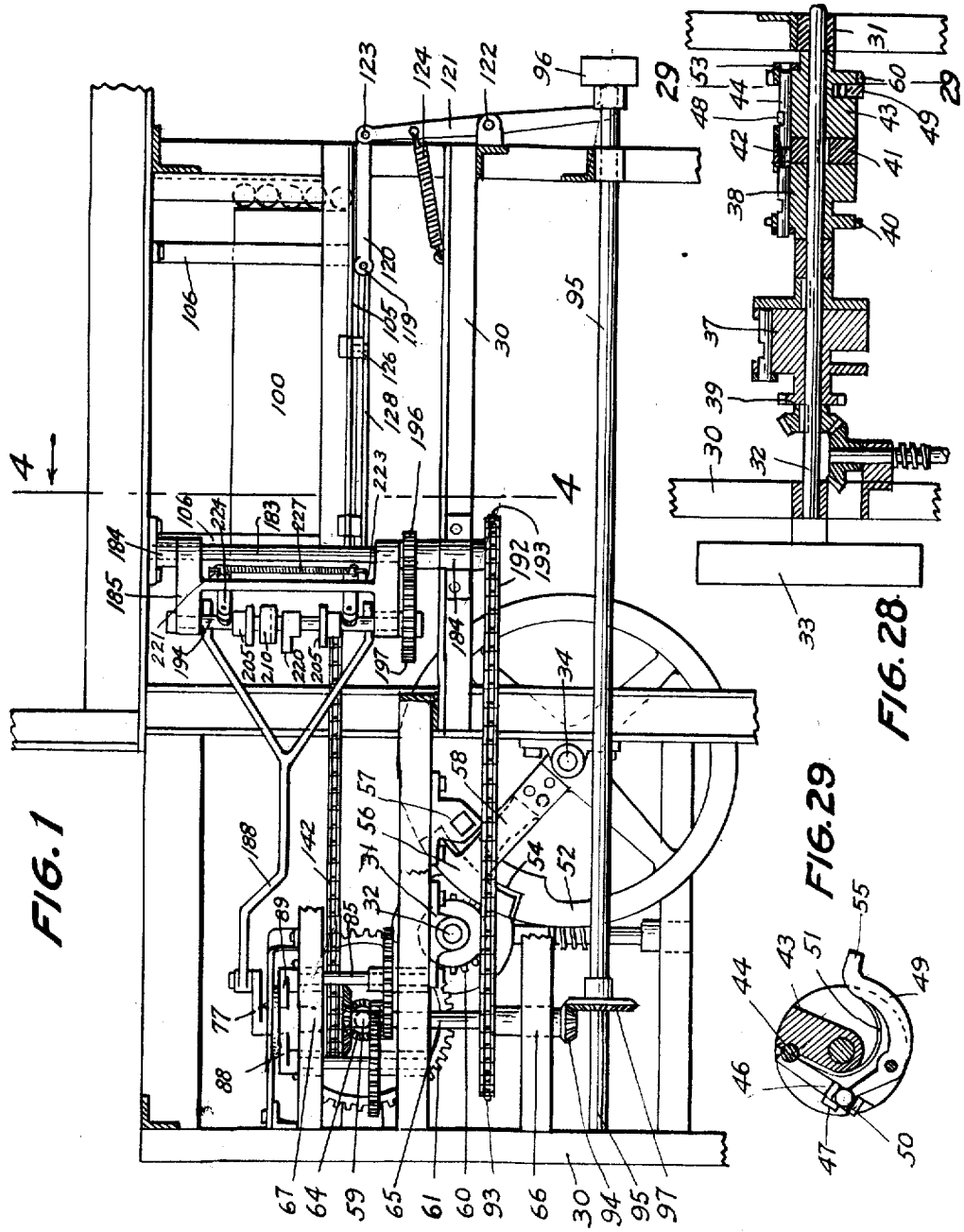

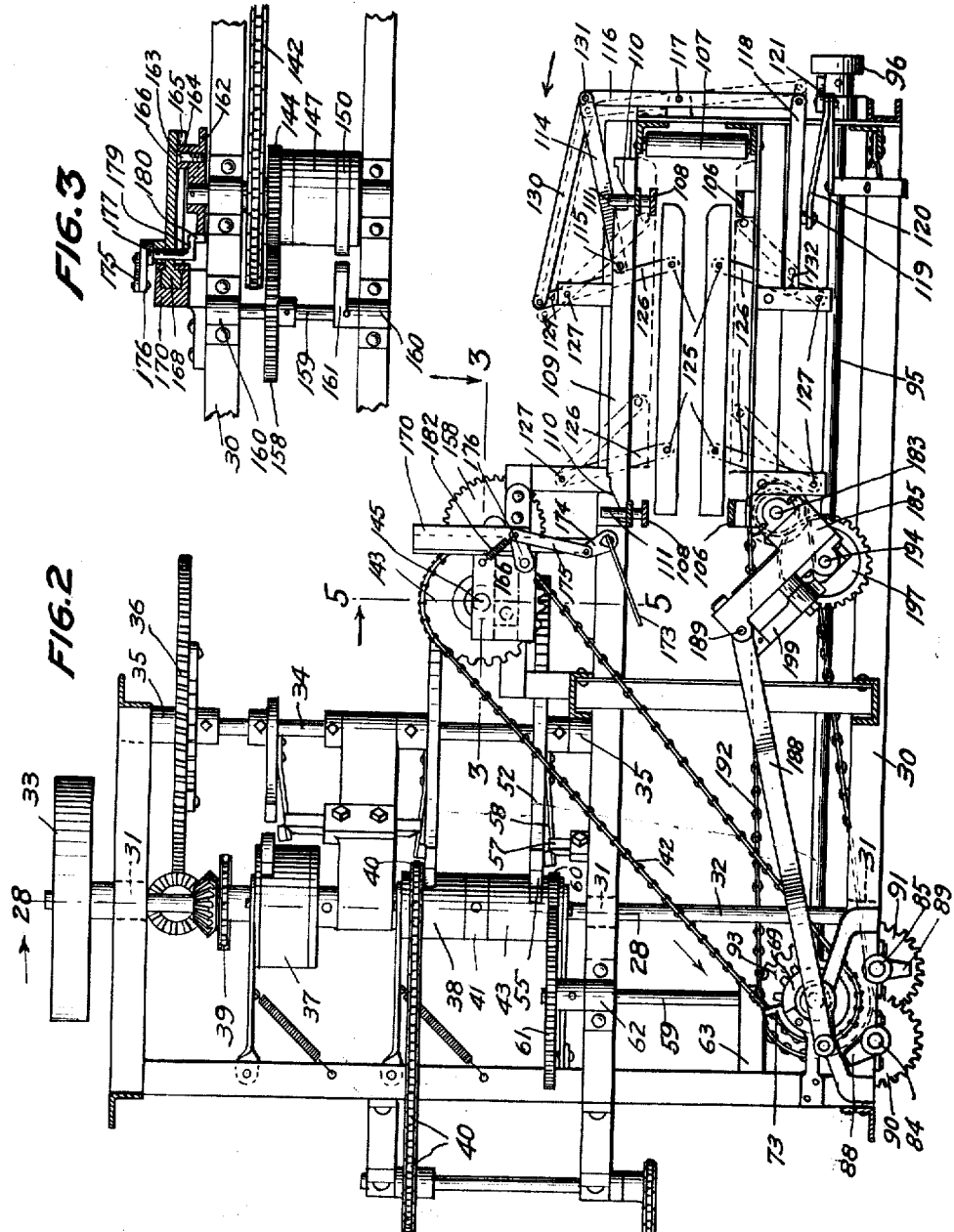

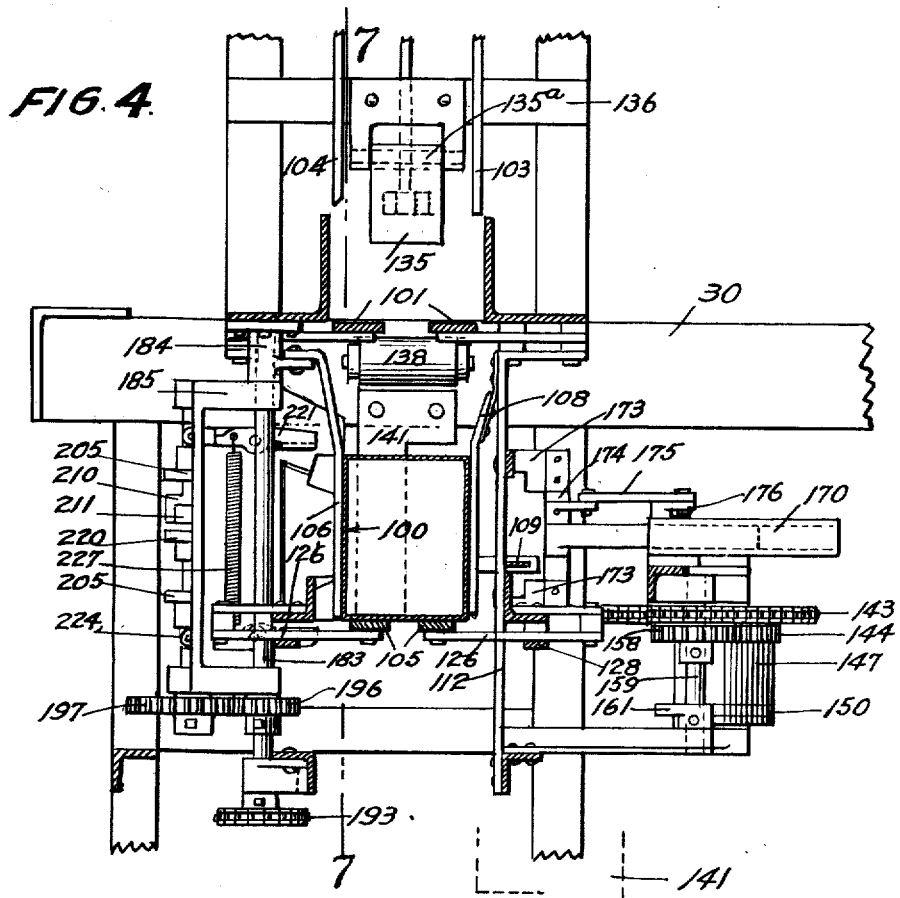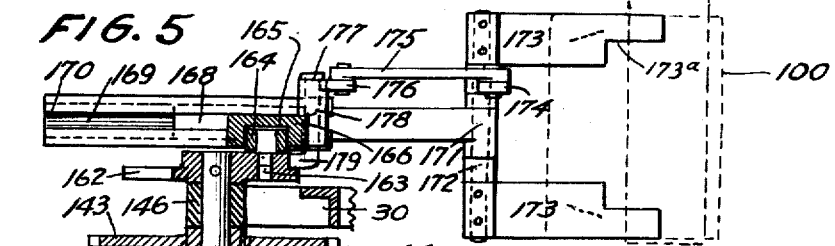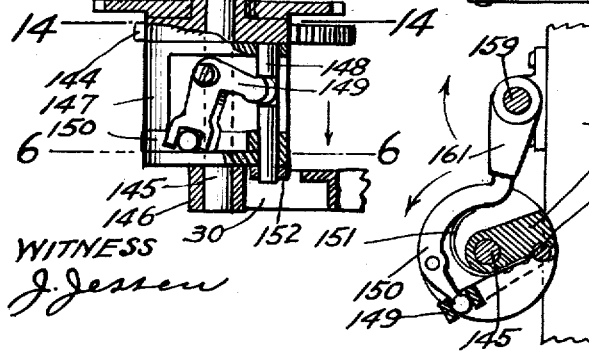

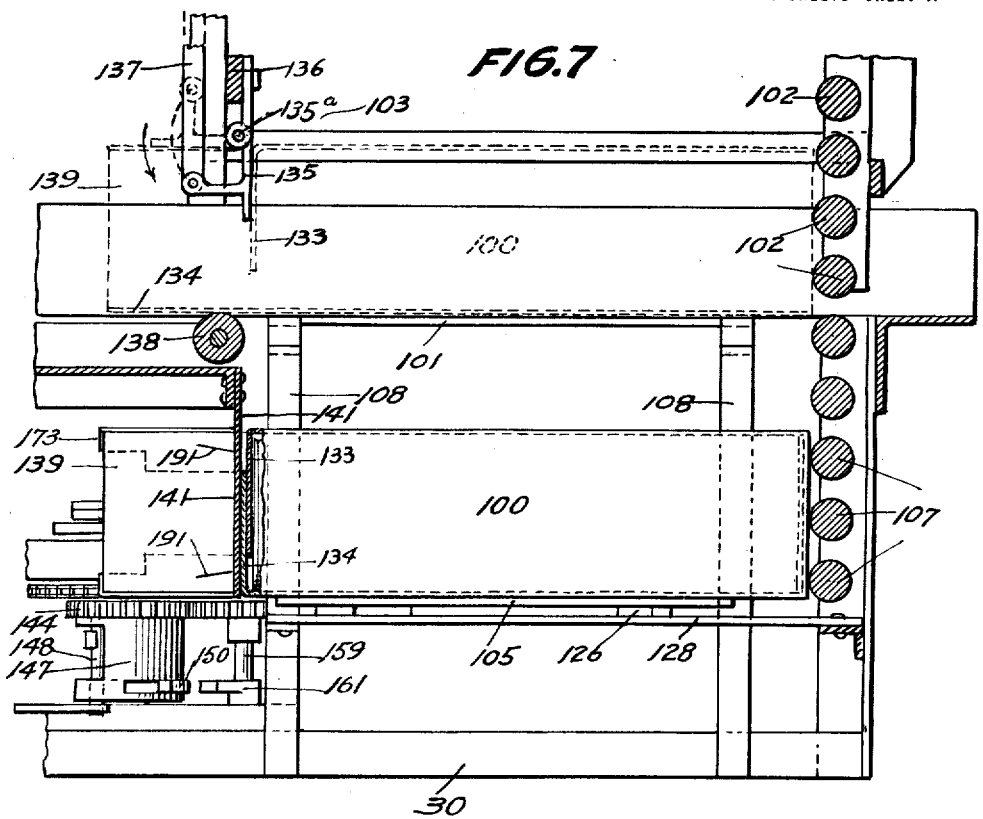

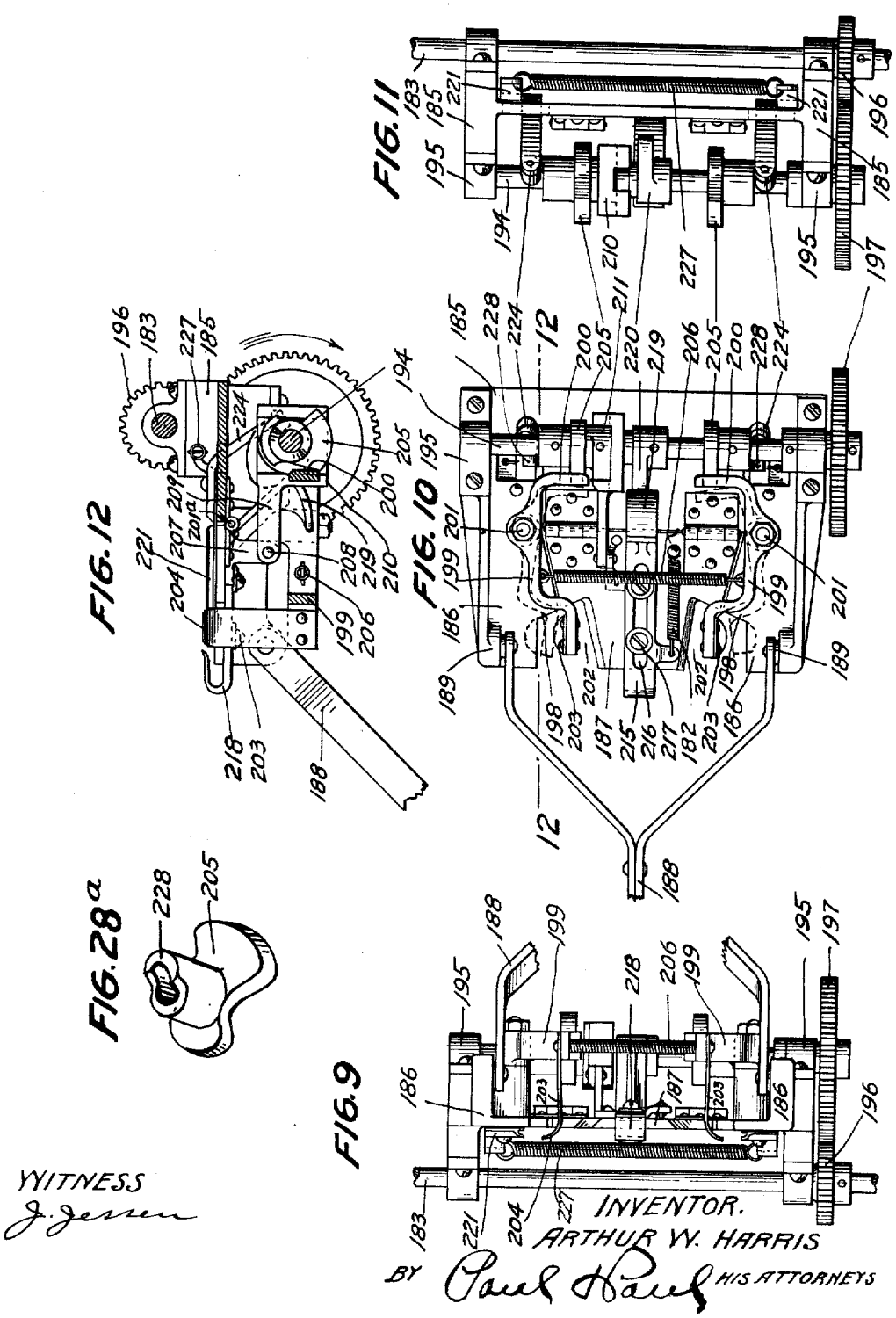

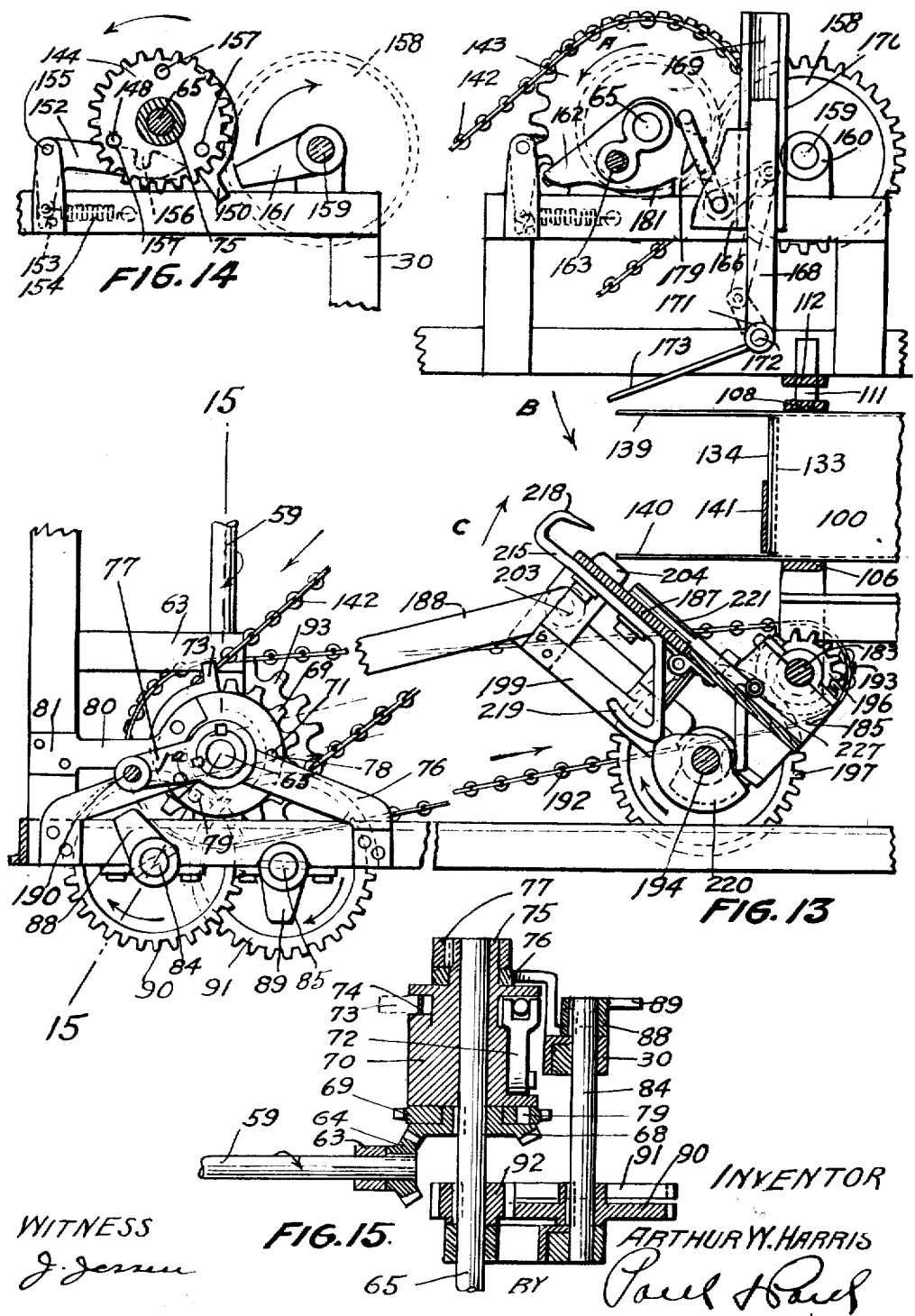

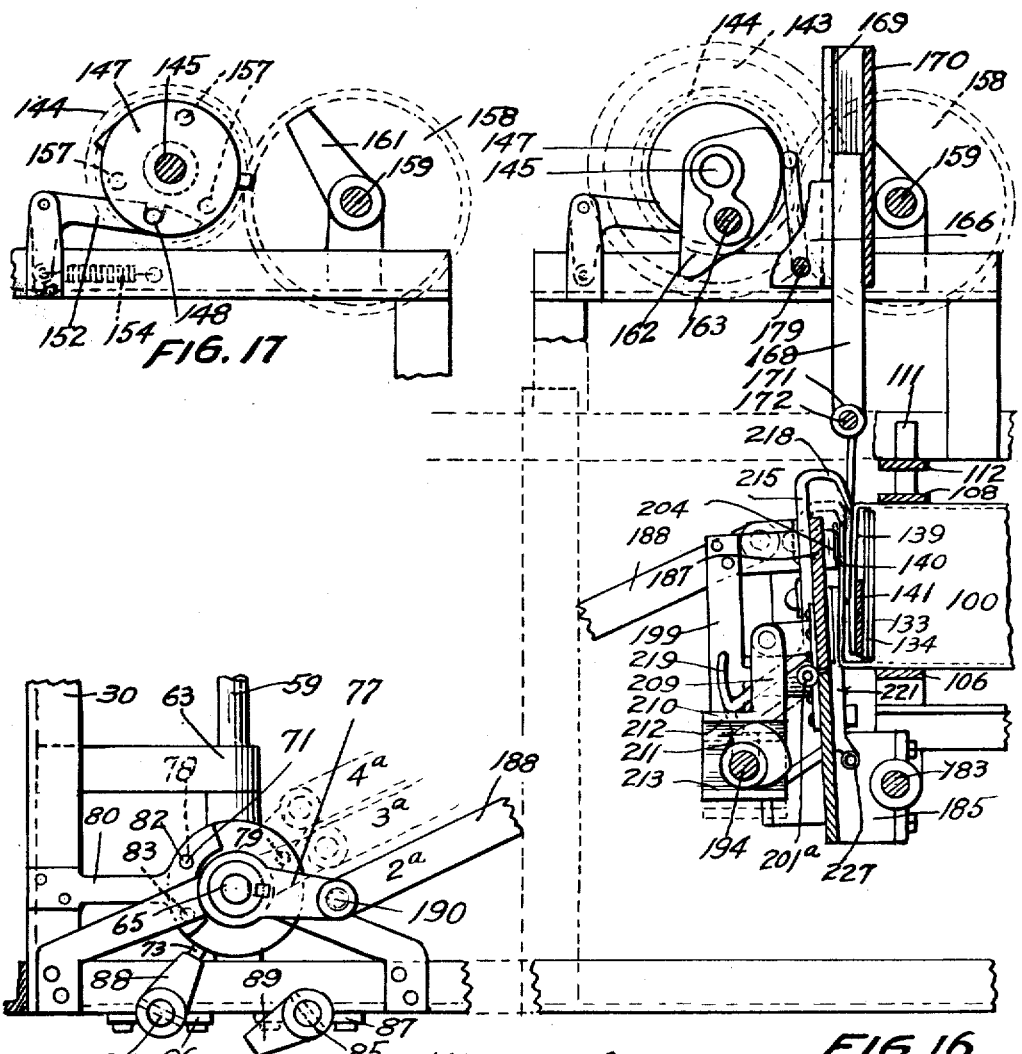

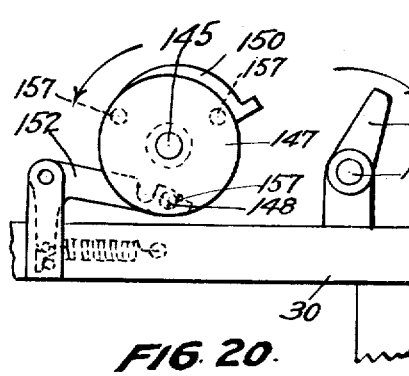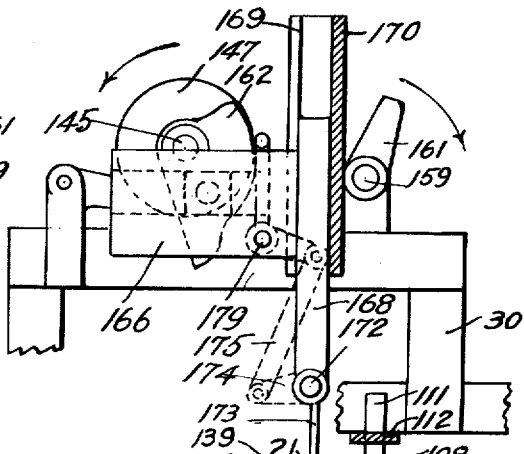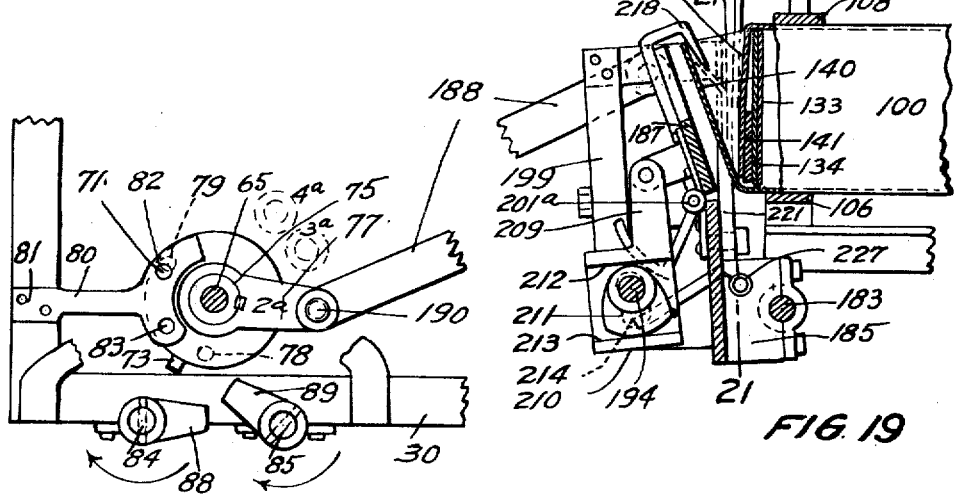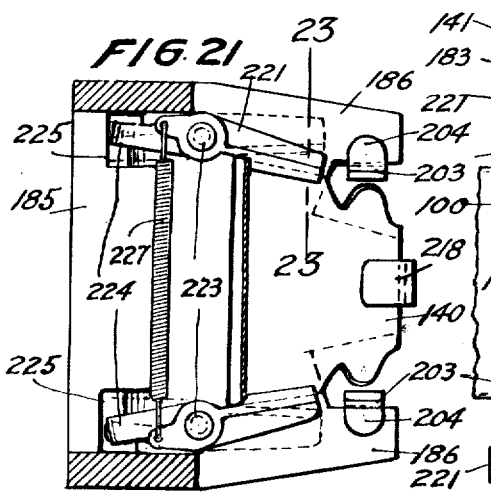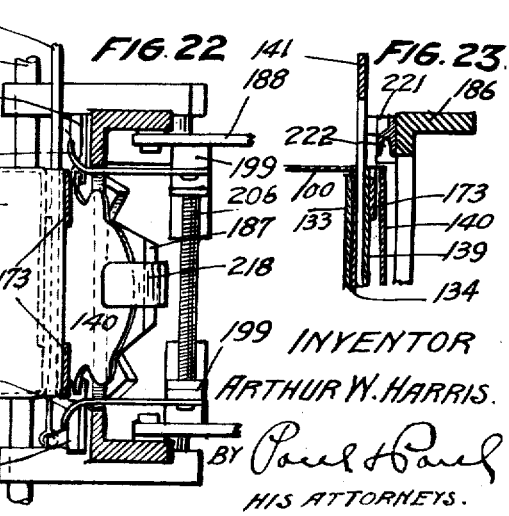

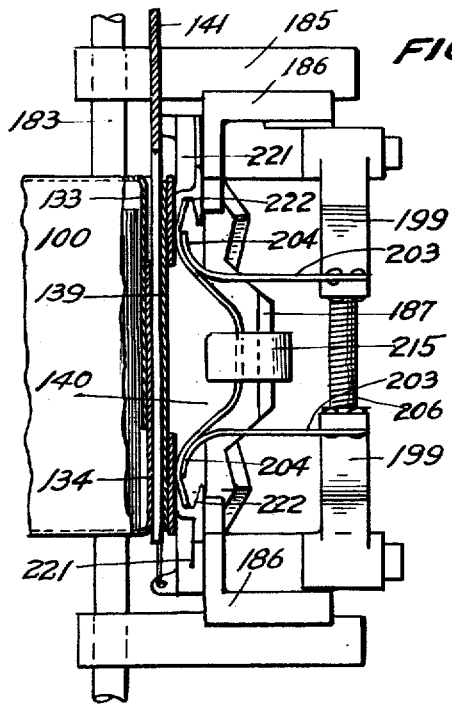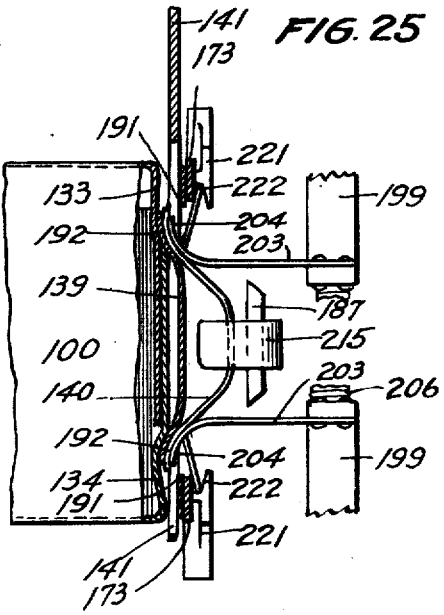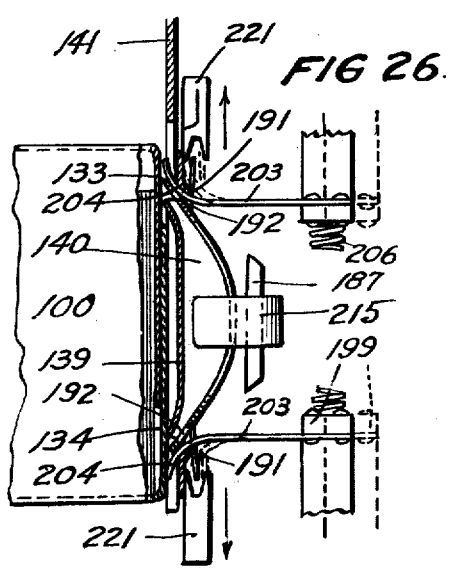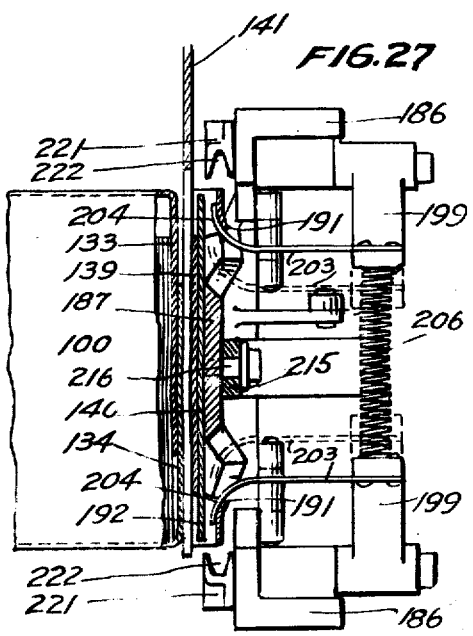

ARTHUR W. HARRIS, OF SLEEPY EYE, MINNESOTA.

PACKAGE CLOSING AND LOCKING MECHANISM.

1,348,643.

Specification of Letters Patent.

Patented Aug. 3, 1920.

Application filed March 17, 1919. Serial No. 283,180.

*To all whom it may concern:*

Be it known that I, ARTHUR W. HARRIS, a citizen of the United States, resident of Sleepy Eye, county of Brown, State of Minnesota, have invented certain new and useful Improvements in Package Closing and Locking Mechanism, of which the following is a specification.

My invention relates in general to devices for automatically folding over and closing the end leaves or flaps of paper cartons or other similar packages and firmly securing the flaps in the closed position after the packages have been filled or packed, and it relates more particularly to a closing and locking device in connection with the carton packing machine disclosed in my application filed January 17, 1919, Serial No. 271,636.

It will be understood, however, that the present invention is not limited to the application in connection with the machine referred to, but may be applied separate or in connection with other devices.

The object of the invention is to provide means for mechanically closing cartons or other packages and interlocking the closing flaps with each other without the use of glue or paste and in such a way that the flaps may be reopened without injury to the package.

Heretofore, packages having interlocking means of this character have generally been closed and secured by hand, involving much labor and expense, and the present invention aims to substitute for such hand labor a rapid, efficient and automatically operating mechanical device.

My invention consists in the various constructions and combinations, all as hereinafter described and particularly pointed out in the claims.

In the accompanying drawings forming part of this specification,

Figure 1 is a side elevation, partly in section, of a portion of a carton filling and packing machine, having my closing and locking device applied thereto, Fig. 2 is a plan view of the machine, preferably the machine forming the subject matter of my application above referred to, Fig. 3 is a detail sectional view on the line 3—3 of Fig. 2, Fig. 4 is a vertical transverse sectional view on the line 4—4 of Fig. 1, Fig. 5 is a detail sectional view on the 5—5 of Fig. 2, Fig. 6 is a detail sectional view on the line 6—6 of Fig. 5, Fig. 7 is a longitudinal sectional view on the line 7—7 of Fig. 4, illustrating how the two inner non-locking flaps may be folded over the end of the carton, Fig. 8 is a perspective view of a completed folded and locking carton, Fig. 9 is an end elevation of the closing and locking mechanism, Fig. 10 is a side elevation of Fig. 9, Fig. 11 is an end elevation of Fig. 10, showing the opposite end from Fig. 9, Fig. 12 is a sectional view on the line 12—12 of Fig. 10, Fig. 13 is a plan sectional view, illustrating the position of the mechanism for closing and securing the two interlocking flaps of the carton immediately before the mechanism is started.

Fig. 14 is a sectional detail view on the line 14—14 of Fig. 5, showing the position of the parts as in Fig. 13, Fig. 15 is a detail sectional view on the line 15—15 of Fig. 13, Fig. 16 is a plan sectional view similar to Fig. 13, but showing the parts advanced the first step in the operation, Fig. 17 is a detail sectional view similar to Fig. 15, showing the parts as in Fig. 16, Fig. 18 is a perspective view of the carton, illustrating the means for supporting the flaps after closing and the form of the interlocking flaps before closing, as in Fig. 13, Fig. 19 is a plan sectional view, similar to Figs. 13 and 16, showing the parts advanced another step in the operation, Fig. 20 is a detail sectional view similar to Figs. 14 and 17, showing the parts as in Fig. 19, Fig. 21 is a sectional view on the line 21—21 of Fig. 19, looking in the direction of the arrow, Fig. 22 is an end elevation of Fig. 21, Fig. 23 is a detail sectional view on the line 23—23 of Fig. 21, showing the flap gripping parts in a different position, Fig. 24 is an illustrative view on a larger scale, similar to Fig. 22, showing the interlocking parts a step further advanced, Fig. 25 is a broken-away sectional view of the interlocking mechanism with the parts another step advanced, Fig. 26 is a similar view with the parts still further advanced, Fig. 27 illustrates the position of the parts when the locking operation has been completed, Fig. 28 is a detail sectional view on the line 28—28 of Fig. 2, Fig. 28ᵃ is a view of a gripper operating cam, Fig. 29 is a sectional view on the line 29—29 of Fig. 28.

*The main driving mechanism.*

Referring to Figs. 1, 2, 28 and 29, numeral 30 represents the main frame, upon which is mounted in bearings 31 the main driving shaft 32, having a suitable driving pulley 33. A clutch control shaft 34 is journaled in bearings 35 and is driven from the shaft 32 by suitable gearing 36 at a predetermined ratio. Clutch mechanism 37 and 38 control the transmission gearing 39 and 40 of the mechanism for feeding the blanks, packing and moving the cartons. As this mechanism is no part of the present invention it will only be referred to in connection with the closing or folding of the two non-interlocking end flaps of the carton for which operating means is provided in the machine referred to.

For the final closing and locking mechanism of the carton, a controlling clutch is provided for periodically stopping the mechanism during the removal or packing of the carton and starting it again at predetermined intervals. Referring to Figs. 1, 2, 5, 28 and 29, the driving shaft 32 is provided with a clutch collar 41, fastened to the shaft and provided with clutch recesses 42. A clutch 43 is mounted loosely on the shaft 32 and a clutch pin 44 is adapted to slide in suitable bearings in the clutch 43, entering the clutch recesses 42 preliminary to the closing and locking operation. A bell crank lever 46, pivoted to the clutch at 47 engages a slot in the clutch pin at 48 and a slot in a pivoted clutch lever 49 at 50. The clutch pin 44 through its bell crank and lever connections is forced into clutch connection with the rotating clutch collar 41 by a spring 51 bearing against the clutch lever 49 and tending to force it outwardly away from the center of the clutch. A cam wheel 52 on the controller shaft 34 periodically engages the clutch lever, forcing it inwardly against the tension of the spring 51 and holding the clutch pin out of engagement with the collar 41 and in locked connection with a stationary locking bar 53 (Fig. 28). A recess 54 is cut away in the periphery of the cam wheel 52 into which the projecting end 55 of the clutch lever enters once during every revolution of the cam wheel and releases the clutch pin from its lock for connection with the clutch collar 41. For the purpose of making a quick release of the clutch lever, I preferably arrange a cam arm segment 56 carried by a spring 58 that is mounted on the cam wheel and a stationary cam bar 57 is adapted to bear against the cam arm 56 and force it into line with the periphery of the wheel 52 against the tension of its spring 58. As the cam arm 56 passes the bar 57 the segment is quickly disengaged from the clutch lever 49 and the clutch pin 44 instantly released for connection with the rotating collar 41, causing rotation of the clutch. This rotation is transmitted in reduced ratio to a countershaft 59 through a gear 60 secured to the clutch 43 and a gear 61 fast to one end of the shaft 59. Bearings 62 and 63 are provided for the shaft 59 and one end of the shaft carries a bevel gear 64, as shown in Figs. 1 and 15. A vertical shaft 65 (see Fig. 15) is journaled in bearings 66 and 57 on the frame 30 and a bevel gear 68 carrying sprocket teeth 69 meshes with the bevel gear 64 and imparts rotation to the shaft 65. A clutch 70, similar to the clutch 43, having a clutch pin 71 (Fig. 13) bell crank 72, clutch lever 73 and spring 74, is loosely mounted on the shaft 65 and rests on the sprocket 69. Said clutch is provided with a hub 75 projecting through bearings 76 and has a crank arm 77 rigidly secured to its upper end (Fig. 15).

The bevel gear 68 is provided with two clutch recesses or holes 78 and 79 for connection with the clutch pin 71 and a spring lock bar 80, fast to the frame 30 at 81, has two holes 82 and 83 into which the clutch pin enters when not connected to the gear 68 (Figs. 15 and 16). Clutch controlling shafts 84 and 85 are mounted in bearings 86 and 87 and carry cam arms 88 and 89 respectively adapted to engage the clutch lever 73 and disconnect the clutch pin 71 from the sprocket 69. Gears 90 and 91 are secured to the shafts 84 and 85 respectively and mesh with a pinion 92 upon the shaft 65 which imparts equal speed of rotation to the shafts 84 and 85 at a ratio of two to one. The shaft 65 furthermore carries a sprocket wheel 93 and a bevel gear 94 (Figs. 1 and 2). A horizontal shaft 95 carrying a cam 96 is mounted in suitable bearings on the frame 30 and receives motion by means of a bevel gear 97 meshing with the gear 94. This shaft, through the cam 96, operates the supporting and discharging means for the carton and is geared to make one complete revolution during the closing and locking operation.

*The supporting and discharging mechanism.*

During the filling or packing operation, the carton or package 100 is supported upon movable shelves 101 between end guides 102 and side bars 103 and 104 (Figs. 4 and 7). The mechanism for moving the shelves 101 and transferring the carton from the upper packing position to the lower closing position is disclosed in the application above referred to and it is deemed only necessary to refer to the action of transference, as the mechanism for effecting the transference is no part of the present invention. In its descent, the carton 100 is arrested by the supporting shelves 105 in position for final closing and locking between stationary guiding 106, end guides 107 and movable gripper bars 108. The bars 108 are spring tensioned against the side of the carton, pressing it firmly against the bars 106, during the closing operation, and during the removal and replacement of the cartons the gripper bars are swung away by means of the cam bar 109, having inclined faces 110 passing through slotted pins 111, fastened to the bars 108 and sliding through openings in the stationary frame bars 112. The cam bar 109 bears against the frame bars on one side and when the bar is moved longitudinally through the slotted pins 111, the inclined faces 110 force the pins and gripper bars away from the carton (Fig. 2). A link 114 is connected at 115 to the cam bar 109 and to one end of a lever 116 pivoted to the frame at 117. The opposite end of the lever 116 is connected to a link 118, having pivoted connections at 119 to a link 120. A cam follower 121 is pivoted to the frame 30 at 122 (see Fig. 1) and to the link 120 at 123 and its lower end engages the cam 96 on the horizontal shaft 95. When the lower end of the follower 121 is forced toward the frame 30 by the cam 96 it will be seen that through the linkage just described the cam bar 109 will be moved in the same direction and will force the pins 111 and gripper bars 108 away from the carton and when returned to the position shown in the drawings, as by a spring 124 (Fig. 1) the gripper bars will be released for closing on the carton. The supporting shelves 105 are removed from under the carton when it is to be discharged from the machine, at the same time the gripper bars 108 are removed. For this purpose the shelves are pivoted at 125 to swinging diagonal arms 126 pivoted to frame extensions at 127 and preferably supported by bars 128 (Figs. 1 and 4). One of the arms 126 has an extension 129 and a link 130 connects this extension at 131 with the lever 115 and link 114. The link 118 at the opposite end of the lever 116 is also pivotally connected to one of the arms 126 at 132 and when the lever is swung in the direction of the arrow in Fig. 2, the shelves are swung outward to the dotted position from under the carton and the cam bar 109 forces the gripper bars 108 away from the side of the carton, letting it drop out of the machine.

*The closing device.*

The non-interlocking end flaps 133 and 134 of the carton 100 may be closed by any preferred means, but as I have shown the present invention in connection with the carton packing machine of my previous application, I have illustrated a part of the closing mechanism of this machine. These non-interlocking end flaps of the carton lie inside when folded and are held by the interlocking flaps 139 and 140.

Referring to Figs. 4, 7 and 13, the means for closing the flaps 133 and 134, controlled and operated by the clutch mechanism 37 and 38, consist of a swinging plate 135, pivoted at 135ᵃ to the movable frame 136, and operated by the aforesaid mechanism (not shown) through a link 137. As the plate 135 is swung downward from the dotted to the full line position in Fig. 7, the flap 133 is folded over the end of the carton 100. The carton is supported as above described upon movable shelves 101 between end guides 102 and side bars 103 and 104 and a roller 138 is arranged under the flap 134 immediately to one side of the folding line. Mechanism, not shown, being a part of my other application, is provided for removing the supporting shelves after the flap 133 has been folded and moving the carton downward from the dotted to the full line position in Fig. 7. As the carton descends, the flap 134 is folded over the flap 133 between the projecting flaps 139 and 140. A plate 141, cut away to about half the width of the carton, is fastened to the frame 30 and underneath the roller 138 and projects downward on a line with the folding side of the roller, and as the flap 134 passes the roller, both flaps are supported and held in the folded position by the projecting portion of the plate 141. As the carton comes to a rest on the shelves 105 and is secured in place, as previously described, it is ready for the closing of the flaps 139 and 140. This operation is controlled and actuated by the clutch 70 by means of the sprocket wheel 69 and the crank arm 77.

Referring to Figs. 1 to 6 and 13, the sprocket wheel 69 transmits rotation through sprocket wheel 142 to the sprocket wheel 143 and a chain 144, loosely mounted upon a vertical gear 144, loosely mounted upon a vertical shaft 145, having bearings 146 on the frame 30. A clutch 147, similar to the clutches heretofore described, having clutch pin 148, bell crank lever 149, clutch lever 150 and spring 151, is secured to the shaft 145. A lock bar 152, normally held against a stop 153 by a spring 154, is pivoted to the frame at 155 and is adapted to receive and lock the clutch pin 148 in a slot 156. Clutch sockets 157 are provided in the gear 144 for engagement with the clutch pin to turn the clutch and shaft. The gear 144 meshes with a gear 158 upon a shaft 159 having bearings 160 and carrying a cam arm 161. This cam arm is adapted to engage the clutch lever 150 to disengage the clutch pin 148 from the gear 144 and force the pin into the slot of the lock bar 152. The shaft 145 extends through the upper bearing 146 above which it has secured to it a cam disk 162 having a crank pin 163 (Fig. 5). A bearing block or roller 164 is preferably arranged upon the crank pin 163 and is engaged in a slotted recess 165 of a plate 166 and a rectangular bar 168 adapted to slide in a slotted frame 169 of a stationary frame bracket 170. The outer end of the bar 168, projecting toward the carton, forms a bearing 171 for a short shaft 172, to which the folder plates 173 are rigidly secured (Fig. 5.) An arm 174, secured to the shaft 172, is connected by a link 175 to an arm 176 of a spindle 177 having bearings 178 in the slide plate 166. Below the bearings 178 the spindle is provided with an arm 179 having a downwardly projecting follower 180 engaging the cam face 181 of the disk 162. A spring 182 (Fig. 2) holds the follower and cam in contact and as the cam disk is rotated in the direction of the arrow A in Fig. 13, the follower is forced outward from the center of the cam, swinging the folder plates inward in the direction of the arrow B (Fig. 13) through the arms 174 and 176 and link 175 (Figs. 2 and 19). This movement closes the flap 139 over the flaps 133 and 134 and plate 141, and is finished slightly in advance of the folding of the flap 140.

Referring to additional Figs. 1, 9, 10, 11 and 12, a vertical shaft 183 is journaled in bearings 184 upon the frame 30 and a swinging yoke 185, having rigid fork arms 186 and a centrally arranged hinged plate 187, is pivotally supported on the shaft 183. A forked connecting link 188 is pivoted to the arms 186 at 189 and to the crank pin 190 of the crank arm 77. As the clutch 70 and crank arm 77 rotate from the position in Fig. 13 to that in Fig. 16, the yoke 185 and plate 187 are swung around the shaft 183 as an axis in the direction of the arrow C in Fig. 13, folding the flap 140 over the end of the carton, covering the folding plates 173, flap 139, plate 141 and flaps 133 and 134 and bringing the parts in position for the interlocking of the flaps 139 and 140. In the cartons or packages as usually manufactured for closing and fastening by hand, slits 191 are provided in one of the interlocking flaps 139 through which the tongues 192 of the other closing flap 140 are passed. To accomplish this the flap 140 must be curved away from the flap 139 after all the flaps have been closed to bring the ends of the tongues in register with the slits and after the insertion of the tongues, the curve in the flap is straightened, forcing the tongues through the slits and between the two flaps 139 and 134. The automatic locking mechanism follows this operation closely in closing and interlocking the flaps.

*The locking mechanism.*

The shaft 183 is driven continually during the whole operation by means of the sprocket 93 of the driving shaft 65, the chain 192 and sprocket 193 upon the shaft 183. A shaft 194, carrying a series of cams, is journaled in projecting bearings 195 on the yoke 185 and is revolved from the shaft 183 by means of gears 196 and 197. The fork arms 186 of the yoke 185 are provided with converging projections 198 and tucker arms 199 having followers 200 which are pivoted to the fork arms at 201. Axially, on a line with the pivots 201 at 201ª is hinged the plate 187, the side of which follows the converging lines of the projections 198 for some distance to where the openings 202 are cut away in the fork arms and plate to make room for the tucker blades 203. These blades are fastened to the tucker arms 199 and projecting through the openings 202 are provided with curved ends 204. The followers 200 of the tucker arms 199 contact with cams 205 and a spring 206 holds the followers firmly against the cams. As the cams rotate, the tucker arms are rocked upon their pivots as indicated in Fig. 10. A projecting arm 207 of the hinged plate 187 is pivotally connected at 208 to a projecting arm 209 of a slotted cam follower 210, as best shown in Figs. 10 and 19. A cam 211, fastened to the shaft 194, operates the follower 210 between shoulders 212 and 213 and a slot 214, fitting the shaft, is cut away in the bottom of the follower. As the cam rotates, the plate 187 swings on its hinges, as shown in Figs. 16 and 19. A bar 215, slidably secured to the plate 187, as by a slot 216 and screws 217, is at one end provided with a hook 218 and at the other end with a segmental cam follower 219, held against a cam 220 by a spring 182. The cam 220 is also fastened to the shaft 194 and as it rotates, the hooked bar 215 slides with respect to the plate 187, as shown in Figs. 13 and 19. At the opposite side of the yoke 185 (see Figs. 9, 21 and 23) two gripper arms 221, provided with slots 222 for gripping the edges of the flap 140 are pivoted at 223 (Figs. 1 and 21). Followers 224 extend diagonally through openings 225 in the yoke 185 and engage cam faces on the cams 205 and a spring 227 holds the followers in contact with the cams. As the cams are rotated, the raised cam faces 228 force the grippers to the full line position in Fig. 21.

The operation of the final folding and locking device is as follows:

The two inner carton flaps 133 and 134 having been folded in the manner above described and the parts being as shown particularly in Figs. 1, 2, 13 and 18, where the stationary plate 141 is shown supporting the folded flaps 133 and 134 and the cam arm 56 having just passed the stationary cam bar 57 and released the clutch pin 44 for connection with the rotating collar 41 on the main driving shaft 23. This shaft will, as the gear ratio is calculated, complete twelve revolutions during the folding and locking operation, when it will be stopped by the peripheral flange of the cam wheel 52 engaging the clutch lever 49 and throwing the clutch pin away from the collar 41 and into the lock bar 53. During this period the following parts will continuously revolve and complete a number of revolutions, as follows: shaft 59—four; shaft 65—two; cam arm shafts 84 and 85—one; sprocket 143 and gear 144—one and one-third; cam arm shaft 159—one; shaft 183—four; cam shaft 194—two, and shaft 95—one revolution. The clutch 70 with crank arm 77 will complete one revolution with two intervening pauses and the clutch 147 will complete one revolution with one intervening pause. The clutch 70, being in operative connection with the bevel gear 68, will at once move with its crank arm to position 2$^a$ shown in full lines in Figs. 16 and 19, or about 150 degrees, where it is stopped by cam arm 88, throwing the clutch pin 71 away from the bevel gear 68 and into the lock bar hole 82. As the gear 68 continues to rotate and likewise the cam arm 88, the clutch pin is held in the locking bar hole 82 by the upper face of the gear 68 and the cam arm 88, having passed the clutch lever 73, the clutch pin will be free to enter the clutch hole 79 to again start the clutch, as shown more clearly in Fig. 19. This will advance the crank arm 77 about 60 degrees to a position 4$^a$ in Fig. 16, where it will be stopped by cam arm 85, forcing the clutch pin 71 into the locking bar hole 83. The clutch will remain at this point until the clutch hole 78 again passes underneath the clutch pin when it will again engage and the clutch will complete the revolutions.

The clutch 147, being also in operative connection with the gear 144 at the commencement of rotation, the cam disk will at once be advanced to position in Fig. 16 or about forty degrees, where it is checked by the cam arm 161 in a similar manner as clutch 70. The rotating gear 144 will hold the clutch pin 148 in the locking bar 152 until the next clutch hole 157 registers with the pin for a pause of 120 degrees, as indicated in Figs. 16 and 17, where the clutch 147 has moved 40 degrees and paused for sixty degrees and the crank arm has moved 150 degrees. The pause of the clutch 147 and cam 162 continues for another sixty degrees, when the next clutch hole 157 registers with the clutch pin and the revolution is completed.

By the rotation of the crank arm 77 and the cam 162 to the positions shown in Figs. 16 and 17, the cam has caused the folding plates 173 to swing on their pivot to fold the flap 139 of the carton over the stationary plate 141 and the crank arm 77 has operated to swing the hinged plate 187 on its pivot to fold the flap 140 over the folding plates 173, the movement of these plates being quick and timed to occur in advance of the movement of the plate 187.

As the plate 187 swings around the cam shaft 124, also revolving, the position of the parts are now as in Fig. 16, the tuckers resting lightly against the flap 139 between the folding plates 173. An open space, somewhat wider than the thickness of the folding plates on account of the bulging of the paper is now formed between the two flaps, which the thin end of the hook is in a position to enter. As the cam shaft revolves at equal speed with the drive shaft, the cams on this shaft have rotated 150 degrees plus about one-quarter the planetary swing of the shaft 194 around the shaft 183, and have brought the cam 220 to a position where a further rotation causes the hook to be drawn inward by the spring 182 to pass between the flaps 139 and 140, as indicated by dotted lines in Fig. 16. At the same time the cam faces 228 are operating to close the grippers 221 over the inner edges of the flap 140. As the shaft revolves, the grippers continue closing and simultaneously the cam 211 causes the plate 187 with the hook 218 thereon to swing outward on its hinge, curving the flap 140 outward in a semi-conical form, the inner edges of the flap being held by the grippers 221, the flap assuming an angular converging position, as illustrated in Figs. 19, 21 and 22. The closing movement of the grippers proceeds slightly in advance of the outward swinging of the hook and during the operation the grippers follow the inward drawing of the flap edges and keep said edges against the end of the carton.

The folder plates 173 assist the grippers in closing over the edge of the flap by preventing sidewise movement of the flap and as soon as the grippers have engaged the edges of the flap the folder plates begin to withdraw from between the flap, the rest periods of the shaft 65 having meanwhile terminated. The crank pin 163, turning in the direction of the arrow from the position shown in Fig. 16, moves the slide 166 and thus causes the flap folding plates to withdraw from the carton, the peculiar formation of the cam surface preventing swinging movement of the cam arm 179 and folder plates until the plates have been entirely removed from between the flaps. While the folder plates are being removed, the continued rotation of the tucker cams 205 causes the spring 206 to move the tuckers 203 to the extreme center position with respect to the carton, as shown in Fig. 24, forcing the tongues 192 against the flap 139 immediately inside the slits 191.

At this point of the operation the crank arm 77 is advanced from position 2ᵃ to 4ᵃ in Figs. 16 and 19 and in passing the center position 3ᵃ, the plate 187 is swung forward against the end of the carton and the tucker ends 204, bearing against the tongues 192, force them toward the carton, bending the flap 139 inward and opening the locking slits in the flap, as shown in Fig. 25. This operation is assisted by the stationary guide plate keeping the main body of the slitted flap from bending inward under the pressure and at the same time the cutaway portion of the guide permits one side of the slit to be opened inward. While the tuckers are pressed inward, the grippers 221 and hook plates 173 are being simultaneously withdrawn, the cutaway portion 173ᵃ of the plates permits the tuckers to pass the outer projecting portion still in contact with the portions of the flap outside the slits. Just before the crank arm 77 reaches the center position 3ᵃ the tucker arms 205 move the tuckers outward to the intermediate position and under the slit wall of the flap, as indicated in Fig. 26, and as the crank arm moves toward position 4ᵃ and recedes the tuckers draw the slit wall outward, the grippers at the same time being withdrawn from the flap edges. The folding plates have by this time been entirely removed and the parts assume the position in Fig. 26. As this position is reached and the crank arm comes to a stop at position 4ᵃ, the hook cam 220 and plate cam 211 have assumed positions which by their continued rotation cause the plate 187 to swing inward and the hook 215 to move outward to be released from the flap 140.

As the plate 187 approaches the carton and straightens out the flap, the tongues are forced outward under the curved tucker ends 204 into the slits until the plate 187 passing slightly beyond the position shown in Fig. 16, completely closes and straightens the flap firmly against the end of the carton and securely locks the tongues under the tuckers and in the slits, as illustrated in Fig. 27. At this point the tucker cam passes again, the intermediate position completing one revolution, and the spring withdraws the tuckers from the slits in the wall, as indicated in dotted lines in Fig. 27. This completes the closing and locking operation and as the crank arm 77 resumes rotation to complete its revolution, the locking plate 187 is swung away from the carton to the original position, the folder cam completes its revolution, the cam shaft 194 completes one more revolution, and the supports for the carton are removed by the rotation of the cam 96, operating as previously described, and the carton is discharged from the machine. The various operating parts come to a stop at their original position after the completion of twelve revolutions of the main driving shaft, when the clutch 43 is disconnected by the engagement of the control wheel 52 with the clutch arm 49.

It will be understood that the details of construction may vary in many particulars from that here shown and described and still come within the scope of this invention, and I do not, therefore, limit myself to the exact construction shown.

I claim as my invention:

1. The combination, with means for holding a carton having closing flaps thereon provided with tongues and slits for interlocking said flaps one with the other, of means for gripping the edges of the tongue-carrying flap and bending the flap to position the tongue thereon to enter the slits of the other flap.

2. The combination, with means for holding a carton having closing flaps thereon provided respectively with tongues and slits for interlocking the flaps one with the other, of arms mounted to grip the edges of the tongue-carrying flap, and means for bending said flap to position the tongues thereon opposite the slits of the other flap.

3. The combination, with means for holding a carton having closing flaps thereon provided respectively with tongues and slits for interlocking the flaps one with the other, of gripper arms mounted to engage the edges of the tongue-carrying flap between them, said arms having followers and cams having faces for engaging said followers, a spring for holding said followers in contact with said cams, the engagement of said cams with said followers pressing said gripper arms against the flap and means for bending said flap to turn the tongues thereon inwardly and position them to enter the slits in the other flap.

4. The combination, with means for holding a carton having closing flaps provided with tongues and slits, of means for gripping the edges of the tongue-carrying flap, means for bending the flap to position the tongues for entering the slits, and means for directing the tongues through the slits.

5. The combination, with means for holding a carton having closing flaps provided with tongues and slits respectively, of plates for folding the inner of said flaps to its closing position, said plates having an initial swinging movement, means for folding the outer flap to its closing position, and interlocking the tongues of one flap with the slits of the other flap, said plates having a final sliding movement to withdraw them from between said flaps and mechanism for operating said plates and said outer flap folding and interlocking means.

6. The combination, with means for holding a filled carton having closing flaps provided with tongues and slits, of plates mounted to engage one of said closing flaps, a slide whereon said plates are supported, a link mechanism connected with said plates for oscillating them, a cam for operating said slide and said link mechanism, and means for folding the other flap and engaging the slits of one flap with the tongues of the other flap.

7. The combination, with means for holding a filled carton having closing flaps provided with slits and tongues for interlocking one with the other, of means for folding and closing the inner of two flaps, a plate mounted to engage and close the outer of two flaps, means slidably mounted on said plate for engaging said outer flap and bending its middle portion outwardly to position its tongues to enter the slits of the other flap, and mechanism mounted to operate said plate and said sliding means successively.

8. The combination, with means for holding a filled carton having closing flaps provided with slits and tongues respectively for interlocking one with the other, of means for closing one of said flaps, means mounted to engage and close the outer flap, a device slidably supported by said outer flap closing means and positioned to engage the middle portion of said outer flap for bending it outwardly to position its tongues to enter the slits in the inner flap, and mechanism for operating said outer flap-closing means and said sliding device successively.

9. The combination, with means for holding a filled carton having closing flaps provided with slits and tongues respectively for interlocking one with the other, of means for closing one of said flaps, means mounted to engage and close the outer flap, a device slidably supported by said outer flap-closing means and positioned to engage the middle portion of said outer flap to bend it outwardly and position said tongues to enter the slits in the inner flap, a cam mechanism for operating said outer flap-closing means and engaging said sliding device with the flap and mechanism for moving said device to engage said outer flap and retracting said flap-closing means to bend said flap.

10. The combination, with means for holding a filled carton having closing flaps thereon provided with slits and tongues for interlocking one with the other, of means for holding the inner of two flaps, means for folding the outer flap to its closing position, means for gripping the edges of said outer flap near the fold therein, means for bending the middle portion of said flap while its edges are held by said gripping means to position the tongues to enter the slits of the other flap, and means for directing said tongues through said slits.

11. The combination, with means for holding a filled carton having closing flaps provided with slits and tongues for interlocking one with the other, of mechanism for closing one of said flaps, a plate mounted to fold the outer flap to its closing position, a hook device carried by said plate to engage said outer flap and bend it outwardly to position the tongues to enter said slits, and a cam mechanism for successively operating said plate and said hook device.

12. The combination, with means for holding a carton having closing flaps thereon provided with slits and tongues for interlocking one with the other, of means for folding the inner of two flaps, a hinged plate folding the outer flap, a hook mounted to engage the outer flap, a hook slidably mounted on said hinged plate and having an inwardly turned end adapted to engage the edge of said outer flap and mechanism for first moving said plate to fold said outer flap and reciprocating said hook to engage it with the edge of said flap, and means for withdrawing said plate and hook to bend said outer flap and position the tongues thereon to enter the slits in the inner flap.

13. The combination, with means for holding a carton having closing flaps thereon provided with tongues and slits, of means for folding the inner of two flaps, a pivoted yoke, a plate hinged thereon, a hook device slidably mounted on said plate and having an inwardly turned end for engagement with the middle portion of said outer flap, means for gripping the edges of said outer flap to hold them during the bending operation, and mechanism for oscillating said plate to first fold said outer flap partially, then projecting said hook and oscillating said plate to position the hook for engagement with the outer flap, then retracting said hook device to enter it between the two flaps, then swinging said plate outwardly to bend the flap and position the tongues thereon to enter the slits.

14. A carton closing device comprising a shaft, a yoke pivoted thereon, a plate hinged on said yoke, a cam shaft driven from said first named shaft, a hook device slidably mounted on said hinged plate, a crank connected with said yoke for oscillating it to fold a carton flap, and mechanism actuated by said cam shaft and cams for oscillating said hinged plate and operating said hook device to bend the flap.

15. A carton flap closing device comprising a shaft, a yoke pivoted thereon, a cam shaft geared to said first-named shaft, a plate hinged on said yoke and having means for engaging and bending the carton flap, a crank arm connected with said yoke for oscillating it to make the initial fold in the flap, and mechanism actuated through said cam shaft for oscillating said hinged plate and operating said flap-engaging means to bend the flap.

16. The combination, with a shaft, of a yoke pivoted thereon, a crank arm connected with said yoke, a clutch controlling the movement of said crank arm, a plate hinged on said yoke, a hook device mounted on said plate for reciprocation thereon independently of the movement of said plate, a shaft geared to said first named shaft, a series of cams thereon and means actuated successively by said cams for oscillating said hinged plate and reciprocating said hook device to engage and bend the flap of a carton.

17. The combination, with means for supporting a carton having closing flaps provided with slits and tongues for interlocking one with the other, of means for moving the flap having the slits therein to its closing position, a shaft, a yoke pivoted thereon, a crank connected with said yoke for oscillating it to partially fold the tongue-carrying flap, a plate hinged in said yoke, a device carried thereby for engaging the edge of said tongue-carrying flap, and cams mounted to oscillate said hinged plate and operate said flap-engaging device to bend said tongue carrying flap and position the tongues thereon to enter the slits in the other closing flap.

18. The combination, with means for supporting a carton having closing flaps provided with slits and tongues for interlocking one with the other, of means for moving the flap having the slits therein to its closing position, a shaft, a yoke pivoted thereon, a crank connected with said yoke for oscillating it to partially fold the tongue-carrying flap, a plate hinged in said yoke, a device carried thereby for engaging the edge of said tongue carrying flap and cams mounted to oscillate said hinged plate and operate said flap-engaging device to bend said tongue-carrying flap and position the tongues thereon to enter the slits in the other closing flap, and means for guiding said tongues into said slits.

19. The combination, with means for supporting a carton having closing flaps provided with slits and tongues for interlocking one with the other, of means for moving the flap having the slits therein to its closing position, a shaft, a yoke for oscillating said shaft to partially fold the tongue-carrying flap, a plate hinged on said yoke, a device carried thereby for engaging the edge of said tongue-carrying flap and cams mounted to oscillate said hinged plate and operate said flap-engaging device to bend said tongue-carrying flap and position the tongues thereon to enter the slits in the other closing flap, and tucker blades for guiding said tongues into the slits of the other closing flap.

20. The combination, with means for holding a carton having closing flaps provided respectively with tongues and slits for interlocking one with the other, of means for folding one of said flaps to its closing position, means for engaging and partially folding the outer flap, means for bending the outer flap to position the tongues thereon to enter the slits of the inner flap, pivoted tucker arms mounted adjacent said outer flap, cams for operating said arms, a spring for holding said arms in contact with said cams, tucker blades mounted on said arms and having curved ends for opening the slits of the inner flap and guiding the tongues of the outer flap through said slits.

21. The combination, with means for holding a carton having closing flaps thereon provided with tongues and slits, of means for folding the inner of the two flaps to its closing position, a shaft, a yoke pivoted thereon, a plate hinged on said yoke, a slide mounted on said plate, grippers for engaging the edges of the outer locking flap, tucker arms having tucker blades for guiding the tongues of the outer flap into the slits of the inner flap, a cam shaft driven from said first-named shaft, cams thereon for successively operating said hinged plate, said slide, said grippers and said tucker arms, a crank connected with said yoke, and mechanism for operating said crank at predetermined intervals to position said yoke and said hinged plate with respect to the flaps.

22. The combination, with means for holding a carton having closing flaps provided respectively with tongues and slits for interlocking one with the other, of means for folding the inner flap to its closing position, a shaft, a yoke pivoted thereon, a plate hinged on said yoke, a spring-retracted slide carried by said plate, gripper arms for engaging the edges of the outer flap for holding it while said slide engages the middle portion to bend the flap, tucker arms having means for guiding the tongues of the outer flap to enter the slits of the inner flap, a cam shaft driven from said first-named shaft, a series of cams thereon for successively operating said hinged plate, said grippers, said slide and said tucker arms, a crank connected with said yoke for moving it and said plate to partially fold the outer flap, and means for timing the movement of said crank, said plate having an independent movement to position the slide to engage and bend said flap, and a final movement to flatten the flap when the tucker arms have guided the tongues of the outer flap through the slits of the inner flap.

23. The combination, with means for supporting a carton having inner and outer closing flaps provided respectively with slits and tongues, of means for folding the inner flap to its closing position, a pivoted yoke, a crank connected with said yoke, a plate hinged on said yoke, a hook mounted to slide on said plate, gripper arms for engaging the edges of the outer flap, tucker arms and blades for engaging the tongues of the outer flap, a shaft, cams mounted thereon for operating said hinged plate, said hook, said grippers and said tucker arms, to position said plate and hook to engage and bend said outer flap while its edges are held by said grippers and position said tuckers to engage said tongues, the initial movement of said crank operating said yoke to fold said outer flap, subsequent movement of said crank pressing said tuckers through said slits and final movement of said crank pulling said tuckers outwardly to open said slits and allow said tongues to slide freely therein when said outer flap is flattened by the final cam-actuated movement of said plate.

24. The combination, with means for supporting a carton having inner and outer closing flaps provided respectively with slits and tongues, of means for folding the inner flap to its closing position, a pivoted yoke, a crank connected with said yoke, a plate hinged on said yoke, a hook mounted to slide on said plate, gripper arms for engaging the edges of the outer flap, tucker arms and blades for engaging the tongues of the outer flap, a shaft, cams mounted thereon for operating said hinged plate, said hook, said grippers, and said tucker arms, to position said plate and hook to engage and bend said outer flap while its edges are held by said grippers and position said tuckers to engage said tongues, the initial movement of said crank operating said yoke to fold said outer flap, subsequent movement of said crank pressing said tuckers through said slits and final movement of said crank pulling said tuckers outwardly to open said slits and allow said tongues to slide freely therein when said outer flap is flattened by the final cam-actuated movement of said plate, and a plate interposed between the carton and said inner closing flap against which plate the inner flap is seated and held while its slits are opened by the tucker arms.

25. The combination, with means for holding a filled carton having closing flaps, of mechanism for holding one of said flaps to its closing position, mechanism for folding the other of said flaps to its closing position and interlocking one flap with the other, a clutch device connected with said folding mechanisms and means for timing the operation of said clutch device.

26. The combination, with means for holding a carton having closing flaps with slits and tongues respectively for interlocking one with the other, of mechanism for folding one of said flaps to its closing position, mechanism for folding the other of said flaps to its closing position and engaging the tongues of one flap with the slits of the other flap, a crank connected with one of said flap-folding mechanisms, a clutch controlling the operation of said crank, and means for timing the movement of said clutch.

27. The combination, with means for holding a carton having closing flaps provided respectively with slits and tongues for interlocking one with the other, of mechanism for folding the inner of said flaps to its closing position, a hinged yoke, a plate pivoted thereon, a crank connected with said yoke for imparting movement thereto at a predetermined point in the closing operation, a clutch controlling the movement of said crank, means carried by said hinged plate for engaging the outer flap to position its tongues to enter the slits of the inner flap, and a cam mechanism for operating said hinged plate and said flap-engaging means.

28. The combination, with means for holding a filled carton having inner non-locking flaps and outer locking flaps, of means for moving said non-locking flaps to their closing position, a plate mounted to engage and hold said flaps in such position, mechanism for folding the locking flaps against said plate, and means for interlocking one of said locking flaps with the other during the folding operation.

29. The combination, with means for supporting a carton having inner non-interlocking flaps and outer locking flaps thereon, said outer flaps having tongues and slits respectively for interlocking engagement, of means for closing said non-interlocking flaps, means for folding the inner locking flap to its closing position, means for folding the outer locking flap and bending it to position the tongues thereon to enter the slits of the inner locking flap, means for guiding the tongues through said slits, clutch mechanisms for controlling the operation of said means, and means for timing the movement of said clutch mechanisms.

30. The combination, with means for supporting a carton having inner non-interlocking flaps and outer locking flaps thereon, said outer flaps having tongues and slits respectively for interlocking engagement, of means for closing said non-interlocking flaps, means for holding said non-interlocking flaps in their closed position, means for folding said locking flaps one upon the other and positioning the tongues of the outer locking flap to enter the slits of the inner flap, and guiding them therein, clutch mechanisms for controlling the operation of said means, and means for timing the movement of said clutch mechanisms.

31. The combination, with means for supporting and gripping a carton having non-interlocking and locking flaps thereon, of means for folding said non-interlocking flaps one against the other, means for folding said locking flaps to their closing position and interlocking one with the other, a clutch mechanism controlling the operation of said supporting and gripping means and said folding and interlocking means, and means for timing the movement of said clutch mechanism.

In witness whereof I have hereunto set my hand this 24th day of February, 1919.

ARTHUR W. HARRIS.